US010229152B2

(12) United States Patent
Bourbonnais et al.

(10) Patent No.: US 10,229,152 B2
(45) Date of Patent: Mar. 12, 2019

(54) AUTOMATICALLY RESTORING DATA REPLICATION CONSISTENCY WITHOUT SERVICE INTERRUPTION DURING PARALLEL APPLY

(71) Applicant: INTERNATIONAL BUSINESS MACHINES CORPORATION, Armonk, NY (US)

(72) Inventors: Serge Bourbonnais, Palo Alto, CA (US); Austin F. D'Costa, Beaverton, OR (US); Xiao Li, San Jose, CA (US); Jonathan Wierenga, Lower Hutt (NZ)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 15/193,903

(22) Filed: Jun. 27, 2016

(65) Prior Publication Data

US 2017/0371914 A1     Dec. 28, 2017

(51) Int. Cl.
*G06F 17/00*     (2006.01)
*G06F 17/30*     (2006.01)

(52) U.S. Cl.
CPC .. *G06F 17/30371* (2013.01); *G06F 17/30575* (2013.01); *G06F 17/30595* (2013.01)

(58) Field of Classification Search
CPC ......... G06F 17/30371; G06F 17/30375; G06F 17/30
USPC .................................................. 707/600–899
See application file for complete search history.

(56) References Cited

U.S. PATENT DOCUMENTS

| 7,672,979 B1 * | 3/2010 | Appellof ............. G06F 11/1435 707/649 |
| 7,974,943 B2 | 7/2011 | Gilbert et al. |
| 2015/0286668 A1 | 10/2015 | Legler |

\* cited by examiner

*Primary Examiner* — Isaac M Woo
(74) *Attorney, Agent, or Firm* — Patents of Demand P.A.; Brian K. Buchheit

(57) ABSTRACT

A data replication method can begin with the detection of an inconsistency between records of a target table and corresponding records of a source table of a relational database management system (RDBMS) performing a parallel apply replication by an improved data replication manager. The target table can be a copy of the source table, both of which include multiple unique constraints and indexes. A timeframe that encompasses the records of the target table having the inconsistency can be determined. The timeframe can utilize a commit timestamp or a log sequence number. Consistency between the target table and the source table can be automatically restored for the determined timeframe through use of a reactive-apply process. Data suppression for updates is automatically restored once the copy is consistent. Transactions performed upon the target table by the reactive-apply process can be performed in parallel. Service at the source table and the target table can be uninterrupted.

1 Claim, 2 Drawing Sheets

AUTOMATICALLY RESTORING DATA REPLICATION CONSISTENCY WITHOUT SERVICE INTERRUPTION DURING PARALLEL APPLY

BACKGROUND

The present invention relates to the field of database replication and, more particularly, to an automated means for restoring data replication consistency without service (i.e., replication and/or transaction processing services) interruption during parallel apply.

In a relational database management system (RDMBS), data is stored in many tables having multiple rows, which each having multiple columns. Frequently, copies (or replicas) of a first table within an RDBMS are made to other RDBMS. The propagation of changes made to one database may occur synchronously or asynchronously. Replicating transactions can change severable tables, but not all tables are necessarily replicated. In a situation where all tables are intended for replication (i.e., subscribed) then the transaction is replicated entirely. For the purpose of embodiments of the disclosure, changes need to be dealt with at the table level within each replicated transaction. Depending on context database and table level replication is referred to herein. Asynchronous propagation copies original changes from a first database table to one or more other tables, subsequent to a completion of a transaction that makes changes. Often asynchronous replication is preferred for low-overhead, and parallel apply of changes is preferred for efficiency, which imposes some challenges with regard to data constraints on a table and referential integrity across tables. For example, changes to a first table can occur while changes to the table are being replicated. The complexity of the challenges that occur with RDBMS table replication increases when a highly optimized technique is being used, such as parallel apply.

Parallel apply processing improves performance of a table replication process by applying units of recovery (UOR) concurrently to target data sets. A number of known techniques exist and are in use in industry that preserve data constraints and referential integrity during parallel apply in asynchronous transaction replication in an RDBMS database, such as those detailed in U.S. Pat. No. 7,240,054 titled "Techniques To Preserve Data Constraints and Referential Integrity in Asynchronous Transactional Replication of Relational Tables" and U.S. Pat. No. 7,330,860 titled "Fault Tolerant Mechanism to Handle Initial Load Of Replicated Object In Live System" which are incorporated by reference herein. Existing parallel apply approaches are unable to handle data tables that have multiple unique constraints properties without issues occurring.

To elaborate, U.S. Pat. No. 7,240,054 (the '054 patent) and conforming approaches teach that secondary unique constraints are to be preserved when a constraint violations occur between at least one row change. The '054 patent provides a lock-free solution for achieving data consistency after an initial load of data, which includes changes and updates of the data that occur in parallel with the initial load. However, the '054 patents detailed technique can lead to unresolvable differences between a source and a target. With existing art and known techniques, initialization methods require users dropping all secondary unique indexes on a target until the source and target are synchronized. This dropping of secondary unique indexes requires a manual creation and running of scripts, which forces taking a target table offline for a period of time, often hours for very large tables. No known solution, applicable to a parallel apply environment is able to automatically restore database consistency when a violation occurs without taking the target table offline and performing manual actions, such as temporarily dropping secondary unique indexes.

To emphasize this point, U.S. Pat. No. 5,884,328 (the '328 patent) titled "System and Method For Synchronizing A Large Database and Its Replica" provides a technique that is unable to be implemented in the parallel apply environment. Specifically, the '328 patent is not applicable to a middleware based RDBMS replication environment where parallel apply is used. Middleware-based replication, from a perspective of the '328 patent, is unable to obtain an appropriate log-capture start LSN ("startlsn") and max commit sequence ("maxcmtseq"). "Startlsn" refers to the log sequence number of the oldest uncommitted transaction that you want to capture. "Maxcmtseq" refers to the most recently committed transaction that was sent/applied to a target RDBMS. Under the '328 patent a replication engine is unable to detect and skip transactions that have been committed/included in an initial load copy. Thus, solutions such as those of the '328 patent that are dependent on values from "startlsn" and "maxcmtseq" are unhelpful in restoring database consistency in a parallel apply environment. No known solution outside the present disclosure exists, which is why conventionally manual efforts are required and which is why a target table is taken offline for a period of time in conventional implementations of highly parallel replication in presence of tables with multiple unique constraints.

BRIEF SUMMARY

One aspect of the present invention can include a method that begins with the detection of an inconsistency between records of a target table and corresponding records of a source table of a relational database management system (RDBMS) that utilizes parallel apply by an improved data replication manager. The inconsistency detected is found within a "fuzzy copy", which is an initial copy of data at a target that is not point-in-time consistent resulting from data being read to create a copy while the data is being updated. The fuzzy copy may be missing changes from a transaction that was not yet committed when the copy was being made. The fuzzy copy is not a point-in-time or snapshot copy of the data, but is instead a copy that is obtained by reading rows from an original database that might have been modified or deleted. These modifications occurring during the copy process are asynchronous to the replication process. In the disclosure, the target table can be a copy of the source table that has multiple different unique indexes or constraints, in addition to the replication key. A timeframe that encompasses the records of the target table having the inconsistency can be determined. The timeframe can be delimited by a commit timestamp or a log sequence number. Consistency between the target table and the source table can be automatically restored for the determined timeframe through use of a reactive apply process. Transactions performed upon the target table by the reactive apply process can be performed in parallel. Service at the source table and the target table can be uninterrupted. Thus, data replication consistency is restored automatically during a parallel apply replication that involved an identified inconsistency without requiring secondary unique indexes to be manually dropped as required by conventional implementations.

Another aspect of the present invention can include a method that begins with the detection of an inconsistency between records of a target table and corresponding records of a source table of a relational database management system (RDBMS) implementing parallel apply techniques (or their effective equivalents) by an improved data replication manager. The target table can be a copy of the source table. The source table can utilize a multi-column unique replication key and can have other multiple secondary unique constraints in addition to the replication key. A timeframe that encompasses the records of the target table having the inconsistency can be determined. The timeframe can be delimited by a commit timestamp or a log sequence number. Consistency between the target table and the source table can be automatically restored for the determined timeframe without service interruption. Restoration of consistency between the tables can include capturing images from a transaction log of the RDBMS associated with the source table for the determined timeframe. The transaction log can document transactions performed upon the source table with a chronological set of before images and after images. The captured images can be conveyed and applied to the target table. Data suppression can be enabled for UPDATE changes; the capture process then sending only the changed values and the replication key. All values of the replication key can be checked in serial for transaction dependency. Transactions can be applied in parallel upon the target table whenever transactions are not modifying the same row as identified by the unique replication key.

Yet another aspect of the present invention can include a computer program product that includes a computer readable storage medium having embedded computer usable program code. The computer usable program code can be configured to detect an inconsistency between records of a target table and corresponding records of a source table of a relational database management system (RDBMS) that implements parallel apply techniques for table replication processes. The target table can be a copy of the source table. The source table can utilize a multi-column replication key and can have other multiple secondary unique constraints in addition to the replication key. The computer usable program code can be configured to determine a timeframe that encompasses the records of the target table having the inconsistency. The timeframe can be delimited using a commit timestamp or a log sequence number. The computer usable program code can be configured to automatically restore consistency between the target table and the source table for the determined timeframe through use of a reactive apply process. Transactions performed upon the target table by the reactive apply process can be performed in parallel. Service at the source table and the target table can be uninterrupted.

DETAILED DESCRIPTION

Figure 1:
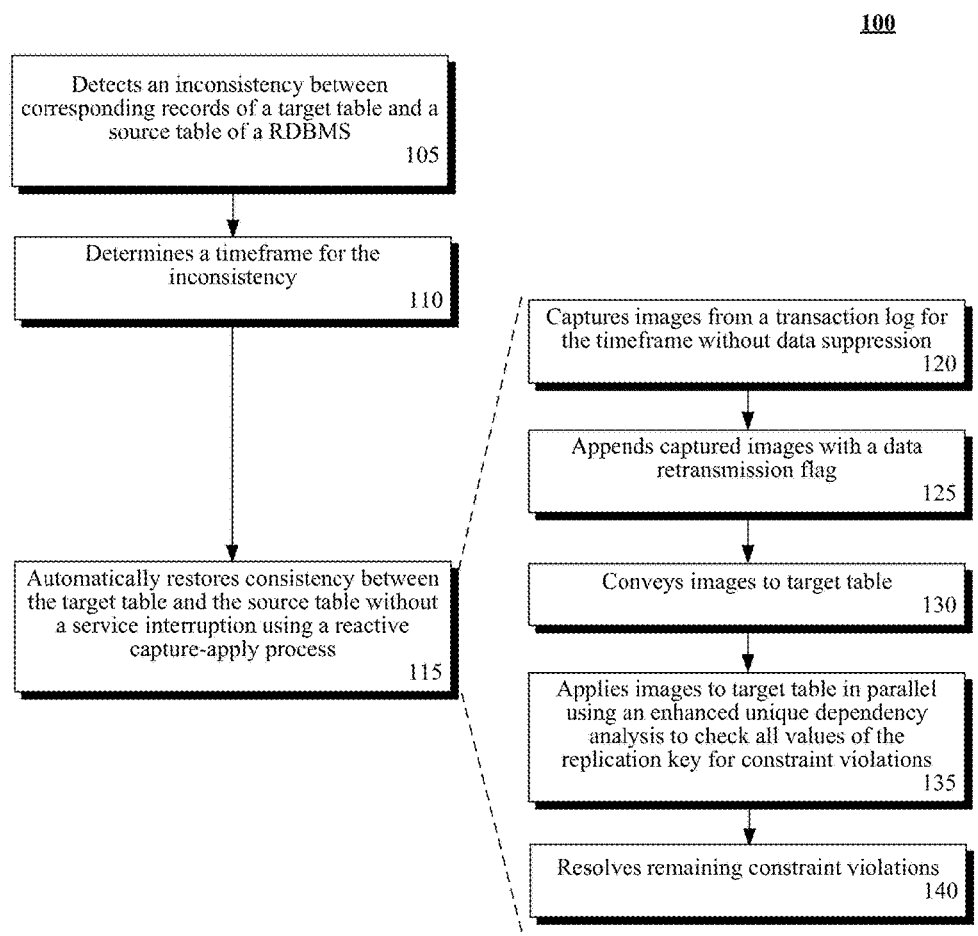
FIG. 1 is a flowchart of a method describing a reactive apply approach for restoring data consistency of live RDBMS tables being replicated using a parallel apply technique during replication in accordance with embodiments of the inventive arrangements disclosed herein.

The present invention discloses a solution for performing data replication between a source and target table having a multi-column replication key with parallel apply to restore consistency without a service interruption. The source and target tables can have multiple unique constraints in addition to the replication key, and the replication process within which a possible consistency abnormality is detected can be a parallel apply based process. In other words, the target can be a fuzzy copy, or an initial copy of the data that is not point-in-time consistent. The fuzzy copy is not a snapshot copy. This can occur when data is read to create the fuzzy copy while the data is being updated. The update process can be an asynchronous one, complicating the restoration of consistency. Upon detection of an inconsistency between records of the source and target tables (e.g., the fuzzy copy), a capture-apply process can determine a timeframe that encompasses the inconsistent records and capture images from the source table's transaction log for that timeframe. The capture part of the process can have data suppression disabled to include full images until consistency is restored. The captured images can be flagged to indicate possible retransmission and sent to the target table. Retransmission is a replicated data change that might already be present at the target, which can occur when replicating to a fuzzy target or when the replication process is restarted explicitly for resending changes already replicated, such as following a suspected data corruption, or data transmission loss. The apply part of the process can check all values of the replication keys for dependencies. An enhanced unique dependency analysis can be used to eliminate out-of-order unique index violations and any remaining constraint violations.

In the disclosure, data constraints and referential integrity of underlying data is preserved in case of failure in determining an exact consistency point from source logs where row changes should be sent. In one embodiment of the disclosure, referential integrity violations will be handled by temporarily dropping them if/when referential integrity violations are encountered during the period of inconsistency, where the referential integrity constraints are added back at the end of the period of inconsistency per embodiments of the disclosure.

Embodiments of the solution utilizes a reactive apply algorithm to resolve unique constraint/index violations encountered due to target point in time inconsistencies from a fuzzy copy on a target. The disclosure handles tables with multiple unique constraints. The disclosed solution is performed in a completely automatic manner and does not impose restrictions on the underlying tables being replicated (such as restricting parallel apply based copying to tables having a single unique index) and does not require manual user intervention (such as temporarily dropping secondary unique indexes and/or manually constructing and executing corrective scripts).

In one embodiment, the reactive apply process can first eliminate a possibility of a unique index violation occurring purely due to out-of-order parallel apply. One contemplated way to eliminate this possibility is to perform a unique index dependency analysis to serialize operations based INSERTs and UPDATEs after image hash collisions. DELETEs and UPDATEs before images are not hashed and are allowed to run in parallel. Any unique index violations due to these are resolved by retrying the transaction until it is the oldest in-flight transaction as ordered by commit time sequence. If the unique index violation still occurs for the oldest transaction it is not due to an out-of-order parallel apply. The first possibility of a unique index violation is also eliminated by using a unique index dependency analysis that is enhanced to include additional checks on before images of DELETE and UPDATE. These are able to be serialized behind any prior INSERTs or UPDATEs if there is a match with AFTER images from those INSERTs or UPDATEs. This eliminates out-of order replay of DELETEs/UPDATEs altogether and any unique index violations that may result. These additional checks need only be done for row changes flagged as "fuzzy." After these processes, any remaining unique index violations for row changes flagged as "fuzzy" are able to be treated as purely due to target point-in-time inconsistencies because of initialization from a fuzzy image copy. These inconsistencies can then be resolved by first deleting the existing row(s) in the target table causing the unique index violations. This is done by constructing a DELETE using a WHERE clause based on columns of the conflicting unique index instead of the replication key. Then the original failing row change that had the unique index or constraint violation is replayed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of a method 100 describing a reactive apply approach for restoring data consistency of live RDBMS tables being replicated using a parallel apply technique during replication in accordance with embodiments of the inventive arrangements disclosed herein. Method 100 can be performed within the context of a relational database management system (RDBMS) that supports data replication, which utilizes a parallel apply technique.

Method 100 can begin in step 105 where an inconsistency between corresponding records of a target table and a source table of a RDBMS can be detected. The inconsistency between the records can be caused by various operations, including, but not limited to, the records could have been copied into the target table while the records in the source table were being updated, the target table could have been created as part of an online initial load, the target table could have been created as part of an offline initial load, and the like.

The source table can represent the table in the RDBMS that live data transactions are performed upon, as is known in the Art. See for example, the database systems detailed in U.S. Pat. No. 7,240,054 and U.S. Pat. No. 7,330,860, which have been incorporated by reference herein, for context. The systems and arrangements detailed therein represent an embodiment of the systems and arrangements within which this disclosure provides an improvement as understandable by one of ordinary skill in the art. The target table can represent a copy of the source table that is maintained by data replication (i.e., transactions are not directly performed upon the target table, but propagated to mirror the source table). The target table represents a fuzzy copy, where a fuzzy copy is an initial copy of the data at the target that is not point-in-time consistent. The fuzzy copy is not a point-in-time or snapshot copy of the data of the source. The source and the target table can include multiple unique indexes.

In particular, the source table, and the target table by extension, can have a replication key comprised of two or more table columns, and in addition any number of additional unique constraints and indexes. This point can be of import to the present disclosure as this approach is designed to handle this situation, unlike conventional data replication techniques, which cannot reliably resolve consistency problems when a table includes multiple unique indexes without manual efforts that require the target table to be taken offline.

A timeframe for the inconsistency can be determined in step 110. The timeframe can encompass all records that were detected in step 105. The timeframe can be defined in terms of commit timestamp and/or log serial number (LSN). Performance of step 110 can vary based upon the cause of the inconsistency.

For example, if the target table was created as part of an online initial load, the timeframe can correspond to the load start and end times.

In step 115, consistency can be automatically restored between the records of the target and source tables without a service interruption by using a reactive apply process. Restoration of consistency can include the performance of steps 120-140.

Images from the source table's transaction log can be captured without data suppression in step 120. Data suppression for UPDATE transactions can be disabled for step 120 to support the conversion of the UPDATE to an INSERT when the record does not exist in the target table. Data suppression can be re-enabled after consistency has been restored. In step 125, the captured images can be appended with a data retransmission flag so the images can be properly handled for replication. The images can be conveyed to the target table in step 130.

In step 135, the images can be applied to the target table, in parallel whenever not modifying the same row. The apply process can use an enhanced unique dependency analysis that checks all values of the unique keys for constraint violations due to out-of-order transactions. If data suppression is enabled, multiple unique index violations cannot be resolved as unchanged column values are also needed. Unique dependency analysis can be used to serialize transactions based on after image hash collisions of INSERTs and UPDATEs.

If data retransmission flag is absent, then DELETES and UPDATEs can be left to run in parallel without checking their before images. Any unique constraint violations can be treated as being due to out-of-order replay of these DELETEs and UPDATEs. Resolution of these unique constraint violations is performed by doing a rollback of the transaction and retrying it as long as it is not the oldest transaction from the source that has not yet been applied.

If data retransmission flag is present, an enhanced unique dependency analysis, used in embodiments, can generate hashes for the before images of DELETEs and UPDATEs and compare them to after image hashes. When a before image of a DELETE or UPDATE matches the after image of an INSERT or UPDATE, the DELETE or UPDATE can be serialized behind the INSERT or UPDATE that produced the matching after image. This enhancement to the unique dependency analysis can eliminate unique constraint violations due to out-of-order replay.

Any remaining constraint violations can be resolved in step 140. The remaining constraint violation can be treated as being due to point-in-time inconsistencies. Resolution of these point-in-time inconsistencies can require the offending record or records to be deleted from the target table and the transaction replayed.

It should be noted that the reactive apply can be an improved version of the apply process inherent to most data replication approaches. However, the reactive apply can address two key short-comings inherent to conventional approaches that use parallel apply for scalability—service interruption and data integrity even when multiple unique constraints exist for a table.

The inability for existing parallel apply approaches to handle tables having multiple unique indices or constraints can be well known in the Art, as this problem has been unresolved for decades. These approaches can impose restrictions to the handling of multiple unique indices in order to support parallel apply like using only one unique index and requiring all other indices to be dropped until consistency has been restored.

Dropping the additional unique indices can be a time-consuming process because it must be performed manually, which exposes the data to another avenue of possible corruption. The manual process of dropping the indices can require the target table to be taken offline, interrupting service. Additional time can be required to restore the dropped indices within the target table after the data has been replicated.

Thus, conventional handling of multiple unique indices can severely limit the data replication process in ways that are unacceptable for high-availability data systems. The present disclosure, as detailed above, can allow the data replication process to overcome these limitations.

Figure 2:
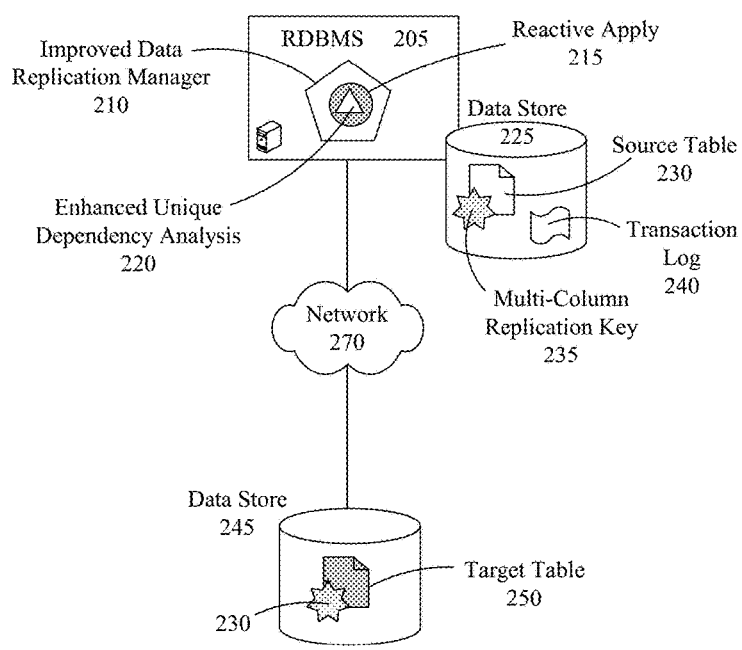
FIG. 2 presents illustrations that visually depict the key points of the improved object detection approach in accordance with embodiments of the inventive arrangements disclosed herein.

FIG. 2 is a block diagram of a system 200 that implements the reactive apply 215 in accordance with embodiments of the inventive arrangements disclosed herein. System 200 can perform the steps of method 100.

In system 200, the reactive apply 215 can be used by the relational database management system (RDBMS) 205 to maintain consistency between the records of the source table 230 and the target table 250. As is well known in the Art, the RDBMS 205 can represent the hardware and/or software necessary to perform a variety of data handling operations.

The source table 230 can be a data structure of the RDBMS 205. The designation of "source" can mean that it is the original storage location for the data. The source table 230 can have a multi-column replication key 235 and several unique constraints.

The multi-column replication key 235 can represent a unique identifier for the records within the source table 230. Values for the multi-column replication key 235 can be obtained from the designated columns of the source table 230.

The target table 250 can be a copy of the source table 230 that exists in another data store 245. Data store 245 can be remotely-located from the RDBMS 205 and interacted with over a network 270. Data transactions can be performed directly upon the source table 230 and replicated upon the target table 250.

The RDBMS 205 can include an improved data replication manager 210 and a data store 225 storing the source table 230 and the transaction log 240. It should be noted that the RDBMS 205 can include a variety of components (not shown) to perform other data handling operations without limiting or detracting from the spirit of the present disclosure.

The improved data replication manager 210 can be the software component of the RDBMS 205 configured to handle the replication of data from the source table 230 to the target table 250. The improved data replication manager 210 of system 200 can utilize a reactive-apply 215 process, unlike the apply process used by conventional data replication components.

The reactive apply 215 can be the algorithms and operations for handling data inconsistencies between the source and target tables 230 and 250. The capture portion of the replication process can capture images from the transaction log 240, as in conventional approaches. However, the images can be captured without data suppression, as discussed in method 100.

The transaction log 240 can document the transactions performed upon the source table 230 as a chronological set of before and after images that is common in the Art.

The reactive-apply 215 can use an enhanced unique dependency analysis 220 to maintain the integrity of the multi-column replication key 235 during replication.

As used herein, presented data stores 225 and 245 can be a physical or virtual storage space configured to store digital information. Data stores 225 and 245 can be physically implemented within any type of hardware including, but not limited to, a magnetic disk, an optical disk, a semiconductor memory, a digitally encoded plastic memory, a holographic memory, or any other recording medium. Data stores 225 and 245 can be a stand-alone storage unit as well as a storage unit formed from a plurality of physical devices. Additionally, information can be stored within data stores 225 and 245 in a variety of manners. For example, information can be stored within a database structure or can be stored within one or more files of a file storage system, where each file may or may not be indexed for information searching purposes. Further, data stores 225 and/or 245 can utilize one or more encryption mechanisms to protect stored information from unauthorized access.

Network 270 can include any hardware/software/and firmware necessary to convey data encoded within carrier waves. Data can be contained within analog or digital signals and conveyed though data or voice channels. Network 270 can include local components and data pathways necessary for communications to be exchanged among computing device components and between integrated device components and peripheral devices. Network 270 can also include network equipment, such as routers, data lines, hubs, and intermediary servers which together form a data network, such as the Internet. Network 270 can also include circuit-based communication components and mobile communication components, such as telephony switches, modems, cellular communication towers, and the like. Network 270 can include line based and/or wireless communication pathways.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
utilizing a reactive apply algorithm to resolve unique constraint/index violations encountered due to target point in time inconsistencies from a fuzzy copy on a target table of a relational database management system (RDBMS);
the reactive apply process first eliminating a possibility of a unique index violation occurring purely due to out-of-order parallel apply;
detecting of an inconsistency between records of the target table and corresponding records of a source table of the RDBMS by an improved data replication manager, wherein the target table is a copy of the source table, wherein the source and the target tables comprise a plurality of multiple column unique indexes one of which is used as the replication key, wherein the target table is the fuzzy copy, which is an initial copy of data from the source table, wherein the fuzzy copy is not point-in-time consistent with the source table and is not a snapshot copy of the source table;
determining a timeframe that encompasses the records of the target table having the inconsistency, wherein said timeframe is delimited using one of a commit timestamp and a log sequence number; and
automatically restoring consistency between the target table and the source table for the determined timeframe through use of a capture-apply process, wherein transactions performed upon the target table by the capture-apply process are performed in parallel, wherein service at the source table and the target table is uninterrupted.

* * * * *